(12) United States Patent
Kim et al.

(10) Patent No.: US 6,469,763 B2
(45) Date of Patent: *Oct. 22, 2002

(54) LIQUID CRYSTAL CELL AND METHOD OF MANUFACTURE

(75) Inventors: Jong Hyun Kim; Ki Hyuk Yoon; Joung Won Woo, all of Seoul; Mi Sook Nam, Kyungki-do; Yoo Jin Choi, Kyungki-do; Kyeong Jin Kim, Kyungki-do, all of (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 09/736,383

(22) Filed: Dec. 15, 2000

(65) Prior Publication Data

US 2001/0000438 A1 Apr. 26, 2001

Related U.S. Application Data

(60) Continuation of application No. 09/079,274, filed on May 15, 1998, now Pat. No. 6,268,897, which is a division of application No. 08/777,126, filed on Dec. 30, 1996, now Pat. No. 6,091,471.

(30) Foreign Application Priority Data

Dec. 29, 1995 (KR) .......................................... 95-67316
Dec. 18, 1996 (KR) .......................................... 96-67426

(51) Int. Cl.$^7$ ............................................. G02F 1/1337
(52) U.S. Cl. ..................... 349/124; 349/128; 349/129
(58) Field of Search .............................. 349/124, 128, 349/129, 123, 126

(56) References Cited

U.S. PATENT DOCUMENTS

| | | | |
|---|---|---|---|
| 4,963,448 A | 10/1990 | Ichimura et al. | 430/20 |
| 4,974,941 A | 12/1990 | Gibbons et al. | 350/349 |
| 5,032,009 A | 7/1991 | Gibbons et al. | 350/349 |
| 5,389,698 A | 2/1995 | Chigrinov et al. | 522/2 |
| 5,437,814 A | 8/1995 | Koden et al. | 252/299.61 |
| 5,576,863 A | 11/1996 | Aoki et al. | 359/76 |
| 5,579,141 A | 11/1996 | Suzuki et al. | 349/129 |
| 5,604,615 A | 2/1997 | Iwagoe et al. | 349/124 |
| 5,623,354 A | 4/1997 | Lien et al. | 349/129 |
| 5,648,829 A | 7/1997 | Yano | 349/129 |

(List continued on next page.)

FOREIGN PATENT DOCUMENTS

| | | |
|---|---|---|
| DE | 2931293 | 2/1981 |
| DE | 3911358 | 10/1990 |
| DE | 4420585 | 12/1995 |
| EP | 0 635 748 A1 * | 1/1995 |
| EP | 0 635 748 | 1/1996 |
| JP | 5-45662 | 2/1993 |
| JP | 7-318942 | 12/1995 |
| WO | WO 95/22075 | 8/1995 |

OTHER PUBLICATIONS

T. Hashimoto et al., "41.4: TN–LCD with Quartered Sub-pixels Using Polarized UV–Light–Irradiated Polymer Orientation Films," SID 95 Digest, pp. 877–880, 1995.

A. Lien et al., "UV Modification of Surface Pretilt of Alighment Layers for Multidomain Liquid Crystal Displays," published Sep. 10, 1995, *American Institute of Physics, Appl. Phys. Lett.*, vol. 67, No. 21, pp. 3108–3110, dated Nov. 20, 1995.

M. Schadt et al., "Surface–Induced Parallel Alignment of Liquid Crystals by Linearly Polymerized Photopolymers," Jpn. J. Appl. Phys. vol. 31, Part 1, No. 7, pp. 2155–2164, Jul. 1992.

*Primary Examiner*—William L. Sikes
*Assistant Examiner*—Dung Nguyen
(74) *Attorney, Agent, or Firm*—Finnegan, Henderson, Farabow, Garrett, & Dunner, L.L.P.

(57) ABSTRACT

A liquid crystal cell having a first substrate with a rubbed layer provided thereon, a second substrate with a photo-aligned layer provided thereon, and a liquid crystal material provided between the substrates.

12 Claims, 15 Drawing Sheets

U.S. PATENT DOCUMENTS

| | | | |
|---|---|---|---|
| 5,654,784 A | 8/1997 | Yasuda et al. | 349/129 |
| 5,666,178 A | 9/1997 | Hirata et al. | 349/129 |
| 5,667,102 A | 9/1997 | Keller | 222/95 |
| 5,689,320 A | 11/1997 | Okada et al. | 349/135 |
| 5,689,322 A | 11/1997 | Hirata et al. | 349/129 |
| 5,712,696 A * | 1/1998 | Toko et al. | 349/123 |
| 5,745,206 A | 4/1998 | Koike et al. | 349/129 |
| 5,858,273 A | 1/1999 | Asaoka et al. | 349/123 |
| 5,882,238 A | 3/1999 | Kim et al. | 349/135 |
| 6,091,471 A * | 7/2000 | Kim et al. | 349/124 |

* cited by examiner

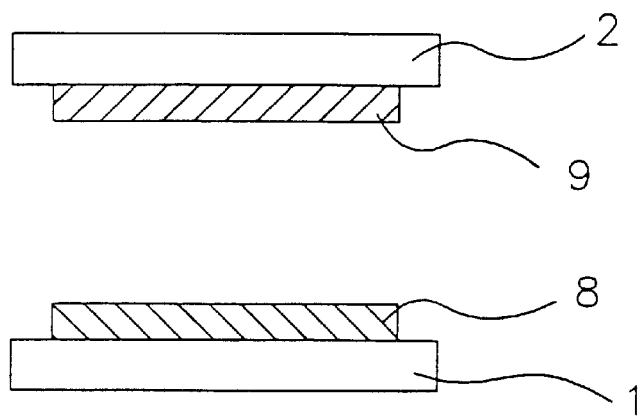
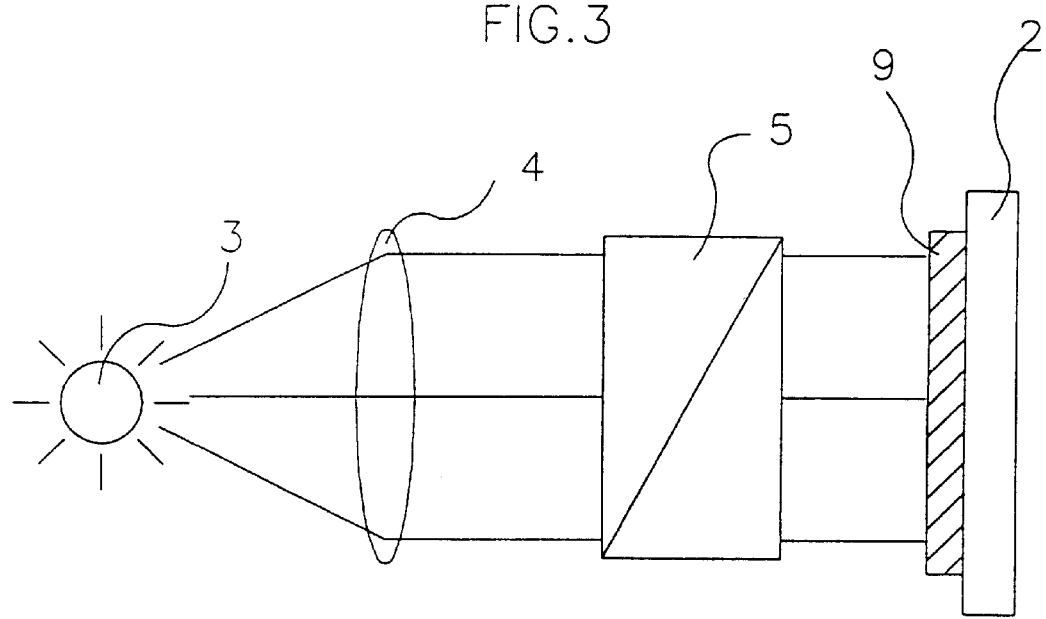

FIG.6f → 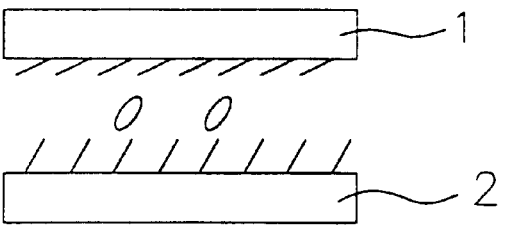

OFF

ON

OFF

ON

OFF

ON

OFF

ON

OFF

ON

OFF

ON

OFF

ON

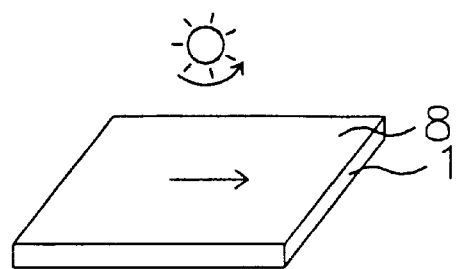
FIG.14a
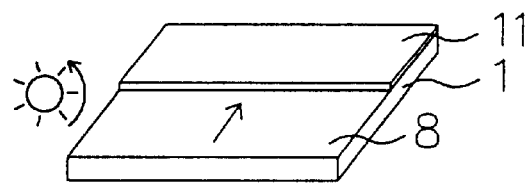
FIG.14b
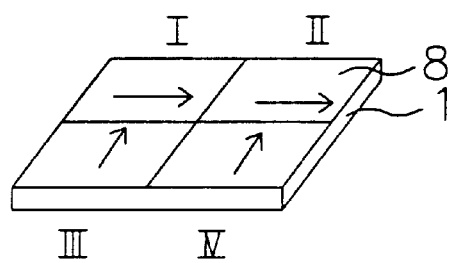
FIG.14c
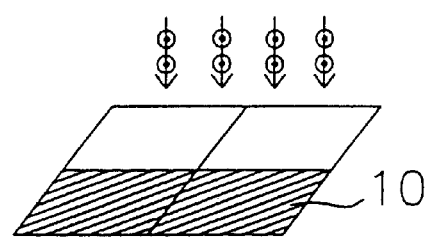
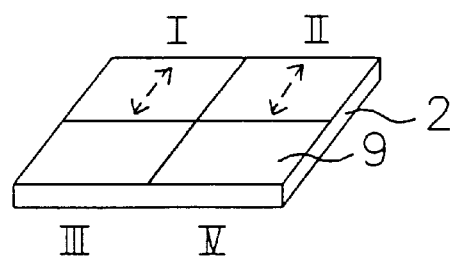
FIG.14d

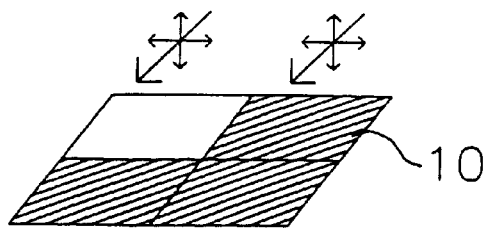
FIG.14e
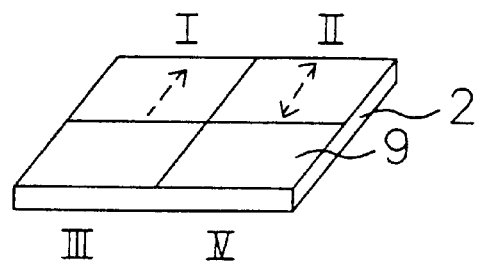
FIG.14f
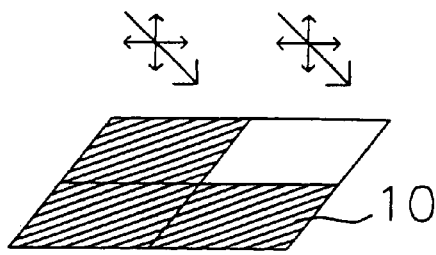
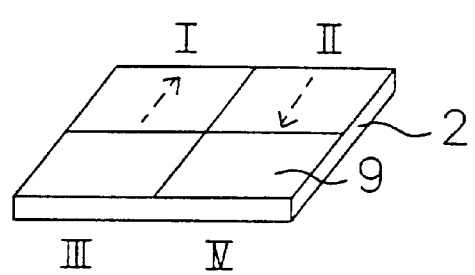
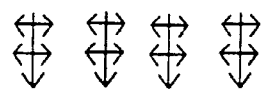
FIG.14g
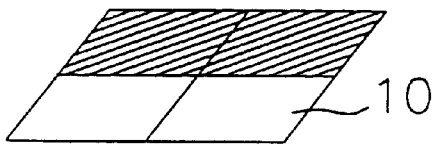
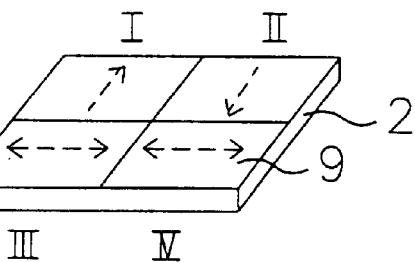

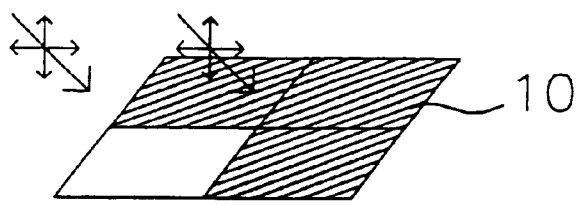
FIG.14h
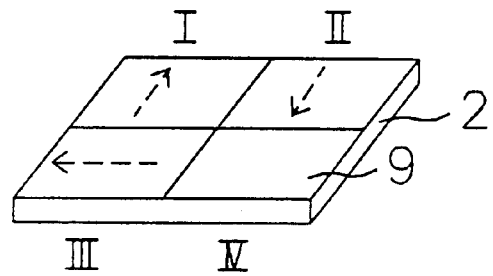
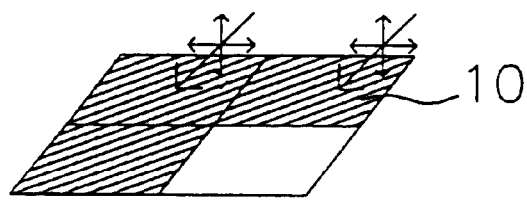
FIG.14i
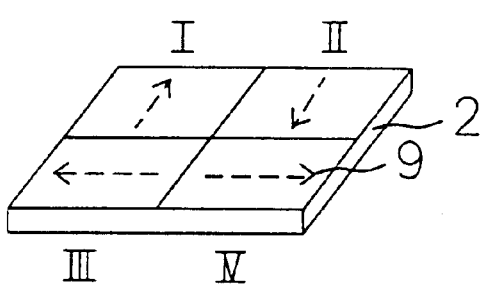
FIG.14j
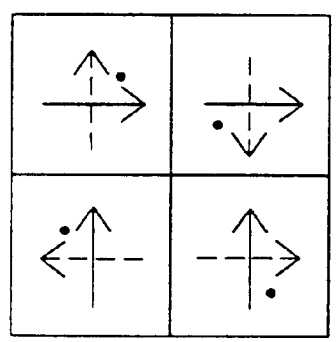

LIQUID CRYSTAL CELL AND METHOD OF MANUFACTURE

This is a continuation division of application Ser. No. 09/079,274, filed May 15, 1998, now U.S. Pat. No. 6,268,897 which is a division of application 08/777,126 filed Dec. 30, 1996, now U.S. Pat. No. 6,091,471 which are incorporated herein by reference.

BACKGROUND OF THE INVENTION

The present invention is related to a liquid crystal cell, more particularly to a liquid crystal cell which is including one substrate coated with rubbed alignment layer and the other substrate coated with photo-aligned alignment layer, and the method for fabricating that.

Generally, the liquid crystal cell is comprising of two substrates and liquid crystal formed between these substrates, the liquid crystal comprising anisotropic molecules. To provide an orderly alignment of liquid crystal in the cell for the uniform brightness and the high contrast ratio of the liquid crystal cell, convnetionally rubbing is carried out on alignment layers coating substrate. The rubbing is mechanical firiction on the alignment layer so as to provide a pretilt of liquid crystal molecules defined by a pretilt angle and a pretilt angle direction. The pretilt angle refers a polar angle and the pretilt angle direction refers a azimuthal angle between the surface of alignment layer and the pretilt.

The pretilt of a liquid crystal molecule adjacent a first alignment layer is called a first pretilt of a first alignment layer, and the pretilt of a liquid crystal molecule adjacent a second alignment layer is called a second pretilt of a second alignment layer. Thereby, the pretilt of a liquid crystal molecule in the midle of two layers is determed by the interaction between pretilts of the first and second alignment layer.

The liquid crystal cell is classified a vertical aligned liquid crystal cell and a horizontal aligned liquid crystal cell depending the pretilt angle. The vertical aligned liquid crystal cell typically defines a liquid crystal cell having a pretilt angle of an alignment layer larger than 60°, the horizontal aligned liquid crystal cell typically refers a liquid crystal cell having a pretilt angle of an alignment layer less than 5°.

There are several modes liquid crystal cell according to relationships between a first pretilt angle direction of a first alignment layer and a second pretilt angle direction of a second alignment layer facing the first substrate. If the first pretilt angle direction is perpendicular to the second alignment direction, it is called a twisted nematic(TN) mode liquid crystal cell. If they are parallel with each other, the liquid crystal cell is called an electrically controlled birefringence(ECB) mode liquid crystal cell and a bend mode liquid crystal cell. In addition, it is called a In-Plane Switching(IPS) mode liquid crystal cell if a pretilt angle direction is shift depending on the voltafe.

A conventionally used liquid crystal display is mainly a twisted nematic liquid crystal display (TNLCD), in which the transmittance is dependent according to the viewing angle at each gray level. Especially, while the transmittance is symmetrical in the horizontal direction, the transmittance is asymmetrical in the vertical direction. Therefore, in the vertical direction, the range with inverted image phenomenon is occurred so that the vertical viewing angle becomes very limited.

To overcome said problems, a multi-domain TNLC cell such as a two-domain liquid crystal cell, and a four-domain liquid crystal cell is introduced. The multi-domain liquid crystal cell has a wider viewing angle by providing more than domains in each pixel, domains having different pretilts each other, so as to compensate the viewing angle dependence of each domain.

The most popular process to obtain said multi-domain liquid crystal cell is mechanical rubbing process, as shown in FIG. 1. Rubbing is performed mechanically on entire substrate 1 coated with alignment layer 8 such as polyimide, so that microgrooves are formed on the surface of the alignment layer 8, as shown in FIG. 1$a$, and FIG. 1$b$. To divide two domains in a pixel, in FIG. 1$c$ and FIG. 1$d$, a photoresist 11 is coated entire alignment layer 8 surface, and the photoresist 11 of one domain is removed by exposing light, reverse rubbing process is carried out on one domain as shown in FIG. 1$e$. The remained photoresist is removed by exposing light, then, two domains are provided on the substrate 1 as shown in FIG. 1$f$. In the two-domain liquid crystal cell obtained thereby, the inversion of viewing angle is compensated by aforementioned process.

However, the rubbing process causes a dust particle and/or an electrostatic discharge, so the yield is reduced and/or the substrate is damaged. The manufacturing process becomes too complicated to apply industry, because the process includes a photolithography which is coating photoresist layer and removing a part of the layer by exposing light, for dividing domains.

Therefore, it is a photo-alignment method that is introduced to simplify alignment process as well as to prevent the damage of substrate. The photo-alignment is the process in which a pretilt angle direction of alignment layer is given by the irradiation of linearly polarized ultraviolet light. The alignment layer used in the photo-alignment method is mainly including PVCN (polyvinyl cinnamate). When ultraviolet light is irradiated into the photo-aligned layer coating the substrate, it causes cyclo-addition between the cinnamoyl groups of cinnamic acid side chains that belong to different photopolymers. Thereby, the direction of the photopolymer configuration i.e., the pretilt of alignment layer is aligned uniformly.

One example of the photo-alignment method is disclosured as a following process. The photo-alignment method is comprising double exposure of linearly polarized ultraviolet light into a substrate coated with PVCN to determine a pretilt, the pretilt including an alignment direction, a pretilt angle direction and pretilt angle. First linearly polarized ultraviolet light is perpendicularly irradiated into the alignment layer coating substrate so as to determine a plurality of pretilt angle direction. Then, second linearly polarized light is obliquely irradiated into the alignment layer again, to determine a pretilt angle and a pretilt angle direction. The pretilt angle and pretilt angle direction are obtained by controlling the second oblique direction relative to the substrate coated with the alignment layer.

However, the photo-alignment method has problems that the process is complicated due to the double exposure and the pretilt angle is too small, for example, the obtained pretilt angles being approximately 0.15°, 0.26° and 0.30° respectively when the oblique irradiation angles are 30°, 45° and 60°. In addition, it takes long time to irradiate light into the alignment layer so total tact time is prolonged, as well, the alignment stability of photo-alignment method is weaker than that of rubbing method.

SUMMARY OF THE INVENTION

An object of the present invention is to provide a liquid crystal cell having an alignment stability and a wilder viewing angle by simply process and the fabrication method thereof.

To achieve the object mentioned above, the method for fabricating the liquid crystal cell of the present invention is comprising the following steps of: providing a first alignment layer on a first substrate; rubbing said first alignment layer such that said first alignment layer has a first pretilt angle associated therewith; providing a second alignment layer on a second substrate; exposing said second alignment layer to light such that said second alignment layer has at least one second pretilt angle associated therewith; and providing a liquid crystal material between said first and second substrates.

The first alignment layer is comprising polyimide, but the second alignment layer is comprising photopolymers, the photo-polymers including polysiloxane based materials. The pretilt angle of this invention is controlled depending upon the photo-energy of the ultraviolet light irradiating.

To determined the second pretilt, this invention includes double irradiation of this invention. The double irradiation is comprising steps of: irradiating polarized light in the perpendicular direction to the second alignment layer and irradiating unpolarized light in the oblique direction to the second alignment layer. In this steps, the latter step can be prior to the former.

Another method for determining the second pretilt in this invention is using flowing effect. The method is comprising the steps of: irradiating polarized light in the perpendicular direction to the second substrate so as to determine a second pretilt angle and two pretilt angle direction; and injecting liquid crystal materials between said first substrate and said second substrate in the perpendicular direction to the polarized direction of the light so as to select a pretilt angle and a second pretilt angle direction.

These and other objects and advantages of the present invention will become clear from the following description of preferred embodiments.

BRIEF DESCRIPTION OF THE DRAWINGS

FIG. 2 is showing a cross-sectional view of liquid crystal cell according to this invention.

FIG. 3 is showing a photo-irradiation device used for photo-alignment process.

FIGS. 6(a)–(f) show steps in a process for fabricating a liquid crystal cell according to this invention.

FIGS. 10(a)–(d) show cross-sectional views of a IPS mode liquid crystal cell according to this invention.

FIGS. 14(a)–(j) show steps in a process for fabricating a multi-domain liquid crystal cell according to this invention.

DETAILED DESCRIPTION OF INVENTION

Figure 1A:
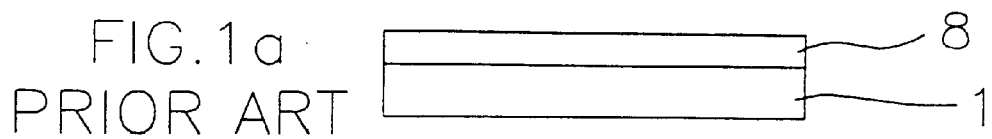
FIGS. 1(a)–(f) show steps in a conventional reverse-rubbing process.
Figure 1B:
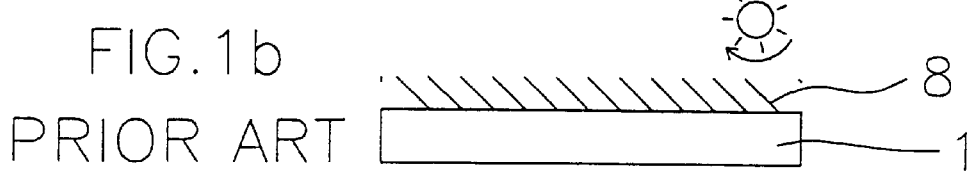
Figure 1C:
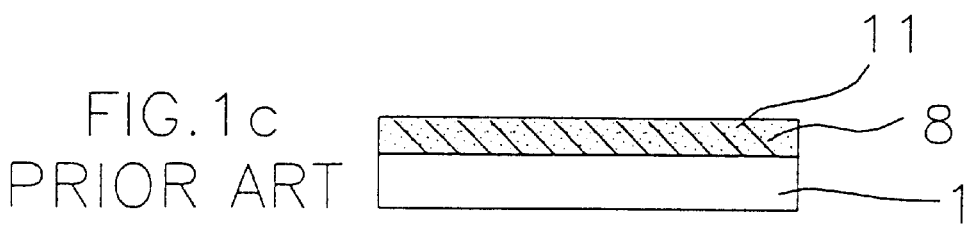
Figure 1D:
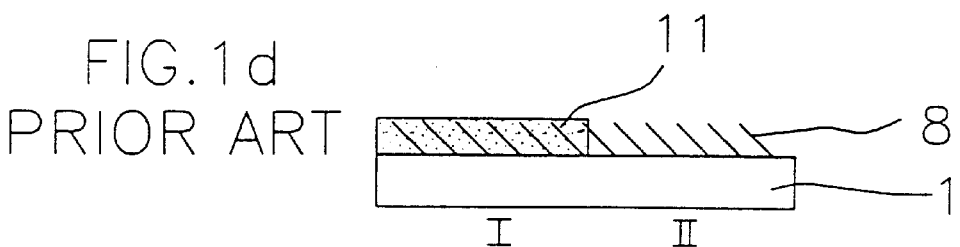
Figure 1E:
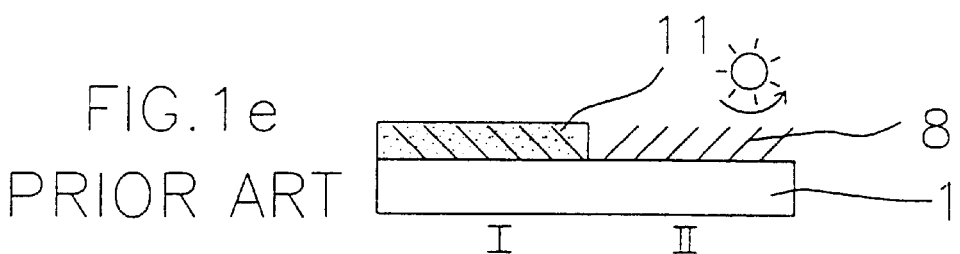
Figure 1F:
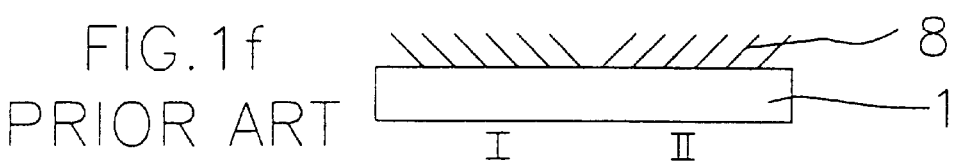

FIG. 2 is a drawing showing the liquid crystal cell, and 1 and 2 indicate a first substrate and a second substrate of the liquid crystal cell, respectively. The first substrate 1 is coated with the first alignment layer 8 formed with polyimide and is rubbed so as to determine a first pretilt defined a first pretilt angle and a first pretilt angle direction. The second substrate 2 is coated with the second alignment layer 9. The material for the second alignment layer 9 includes photo-polymers such as polysiloxane based materials. Polysiloxane cinnamate, one of the polysiloxane based materials have following structural formulas:

polysiloxane cinnamate I:

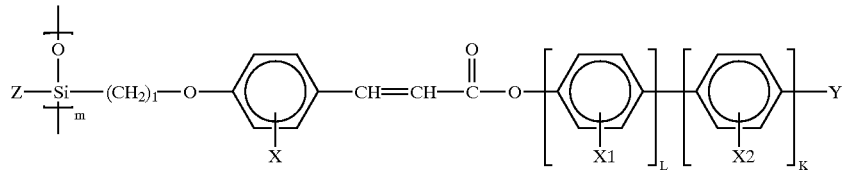

Z can be selected from the group consisting of OH, $CH_3$ or from mixtures thereof,
m=10–100,
l=1–11,
L=0 or 1,
K=0 or 1, X, $X_1$, $X_2$, Y=H, F, Cl, CN, $CF_3$, $C_nH_{2n+1}$ wherein n can be from 1 to 10, or from mixtures thereof; polysiloxane cinnamate II:

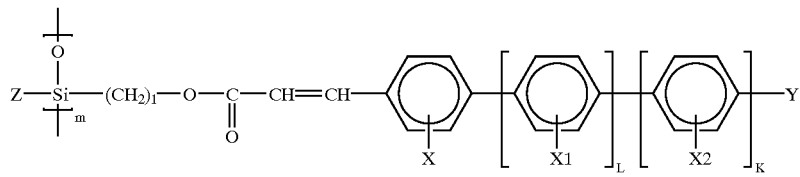

Z can be selected from the group consisting of OH, $CH_3$ or from mixtures thereof,
m=10–100,
l=1–11,
L=0 or 1,
K=0 or 1,
X, $X_1$, $X_2$, Y=H, F, Cl, CN, $CF_3$, $C_nH_{2n+1}$ or $OC_nH_{2n+1}$ wherein n can be from 1 to 10, or from mixtures thereof.

Then, the second substrate 2 coated with a second alignment layer 9 is exposed ultraviolet light by a photo-irradiation device in FIG. 3. The device includes the lamp 3 generating ultraviolet light, a lens 4 and a polarizer 5 linearly polarizing the ultraviolet light from lamp 3. To irradiate ultraviolet light into the alignment layer 9 of the substrate 2, the ultraviolet light generated from the lamp 3 is passed the lens 4 and linearly polarized through polarizer 5, then the ultraviolet light is irradiated into the alignment layer 9 coating substrate 2. The lamp 3 is the Mercury(Hg) lamp having the wave length of 365 nm.

Figure 4:
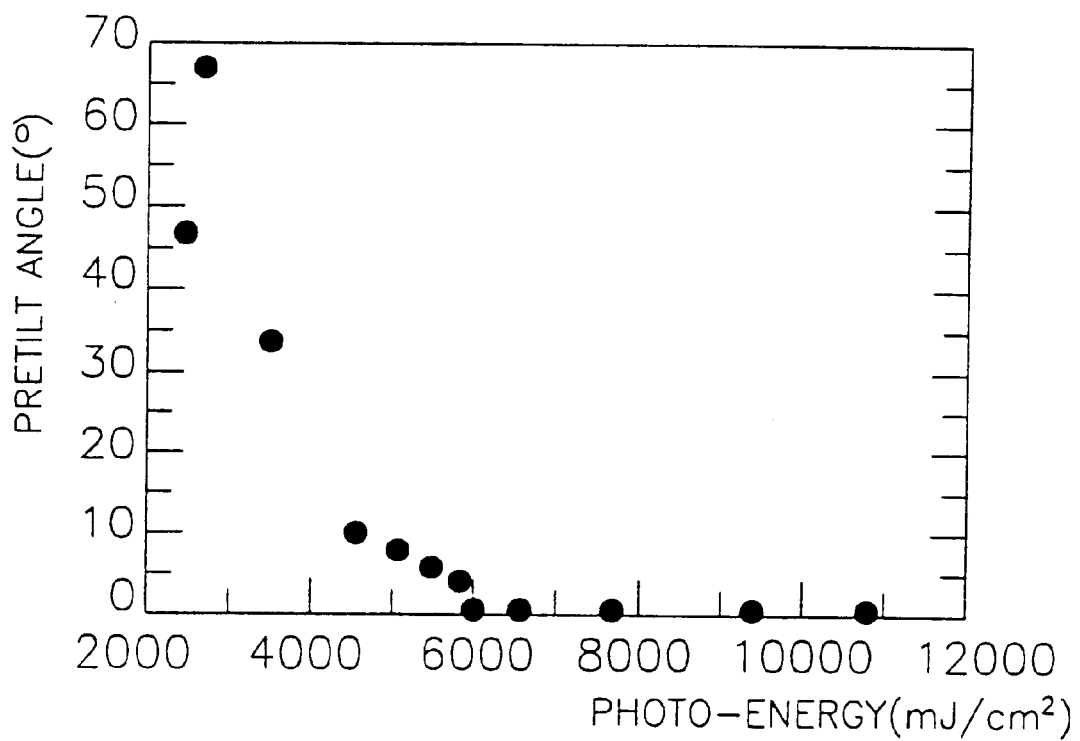
FIG. 4 is a graph illustrating the relationship between the photo-energy of ultraviolet light and the pretilt angle of the photo-aligned layer formed with polysiloxane based materials.

In that time, the pretilt angle formed on the alignment layer 9 can be controlled by photo-energy. When ultraviolet light is perpendicularly irradiated into the substrate 2 coated with alignment layer 9 of polysiloxane based materials, the pretilt angle of the alignment layer 9 surface is controlled in a broad range according to the photo-energy of the ultraviolet light, as shown in FIG. 4. Referring to this figure, the pretilt angle can be controlled depending the photo-energy irradiated into the alignment layer 9 (the wavelength of ultraviolet light is 350 nm). The pretilt angle is exponentially get down according to the photo-energy of ultraviolet light to at almost 0° at 6,000 mJ/cm.

The vertical aliged liquid crystal cell can be fabricated by adopting photo-energy less than 2,000 $mJ/cm^2$, and the horizontal aligned liquid crystal cell can be fabricated by adopting photo-energy more than 5,000 $mJ/cm^2$.

FIG. 5 is showing one embodiment of a process for fabricating a liquid crystal cell which comprises a first substrate, a second substrate and a liquid crystal layer injected therebetween. The first substrate 1 coated with a first alignment layer 8 is mechanically rubbed to determine a pretilt, the pretilt meaning a pretilt angle and a pretilt angle direction, as shown in FIG. 5a and FIG. 5b.

Figure 5A:
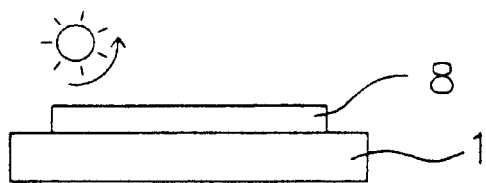
FIGS. 5(a)–(f) show steps in a process for fabricating a liquid crystal cell according to this invention.
Figure 5B:
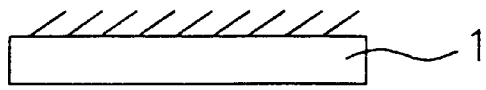
Figure 5C:
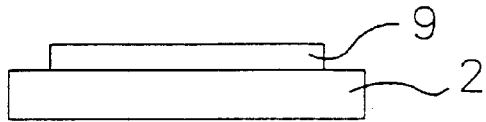
Figure 5D:
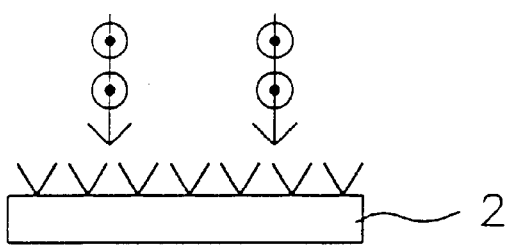
Figure 5E:
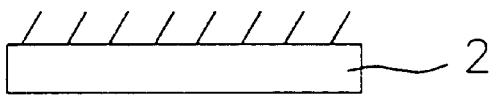
Figure 5F:
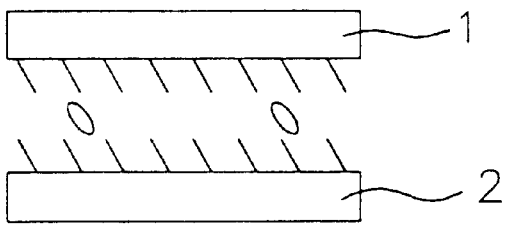

The polarized light is irradiated in the perpendicular direction onto the second substrate 2 coated with a second alignment layer 9 so as to determine a second pretilt angle and two pretilt angle direction facing each other as shown in FIG. 5c and FIG. 5d. To select one pretilt angle direction, nonpolarized light is irradiated in the oblique direction onto the alignment layer 9 on the substrate 2 so as to determine a second pretilt oriented with one pretilt angle direction. In FIG. 5f, attaching the first substrate 1 and the second substrate 2, liquid crystal materials are injected between two substrates 1,2 so as to align uniformly by the stable anchoring provided by the first pretilt.

In addition, it is also possible that the oblique-irradiation can be carried out prior to the perpendicular irradiation in this embodiment.

FIG. 6 is showing another embodiment of a process for fabricating a liquid crystal cell which comprises a first substrate, a second substrate and a liquid crystal layer injected therebetween. The first substrate 1 is coated with a first alignment layer 8 is mechanically rubbed to determine a pretilt, the pretilt meaning a pretilt angle and a pretilt angle direction, as shown in FIG. 6a and FIG. 6b.

Figure 6A:
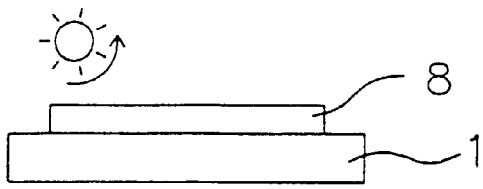
Figure 6B:
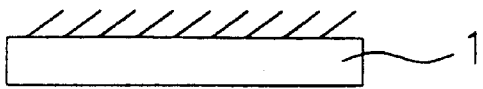
Figure 6C:
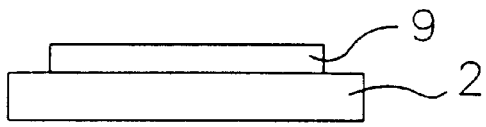
Figure 6D:
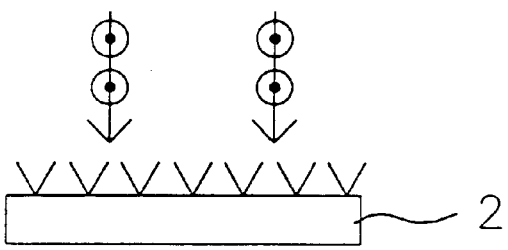
Figure 6E:
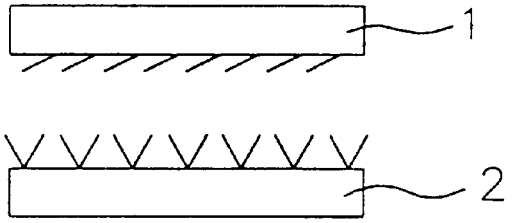
Figure 7A:
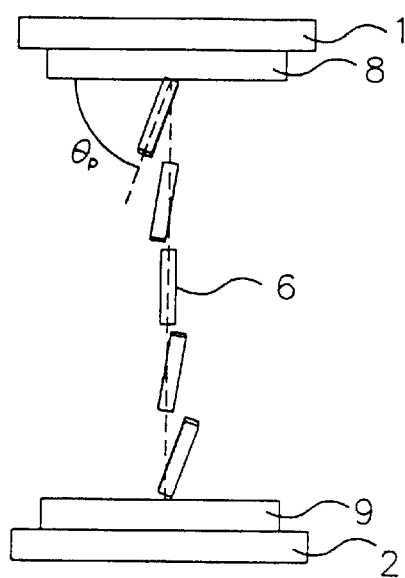
FIGS. 7(a)–(d) show cross-sectional views of a TN mode liquid crystal cells according to this invention.
Figure 7B:
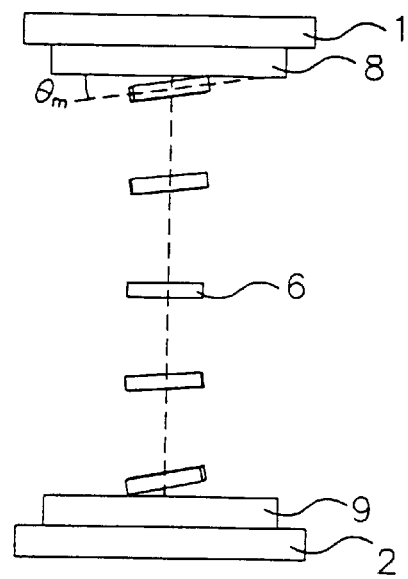
Figure 7C:
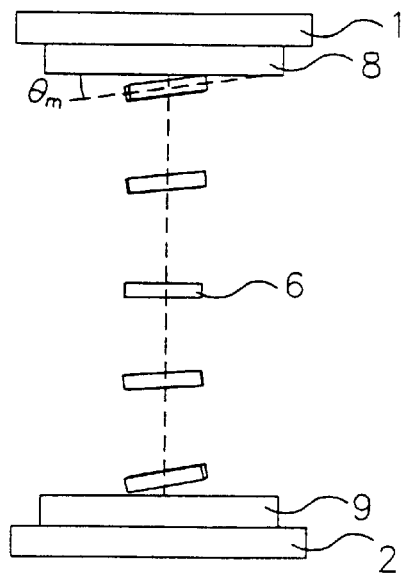
Figure 7D:
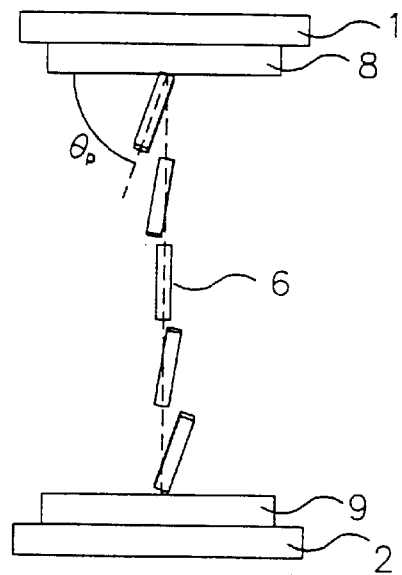
Figure 8A:
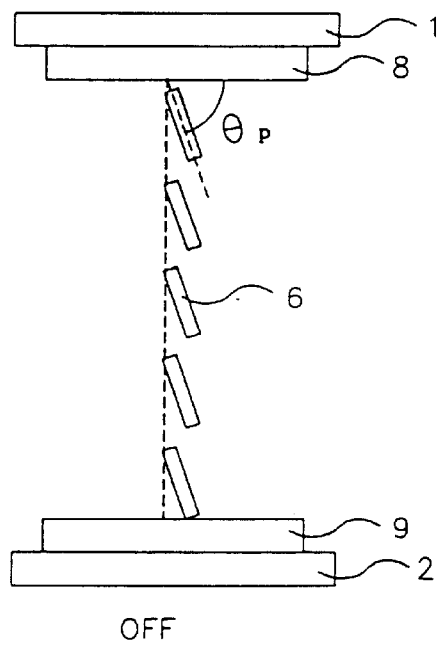
FIGS. 8(a)–(d) show cross-sectional views of a ECB mode liquid crystal cells according to this invention.
Figure 8B:
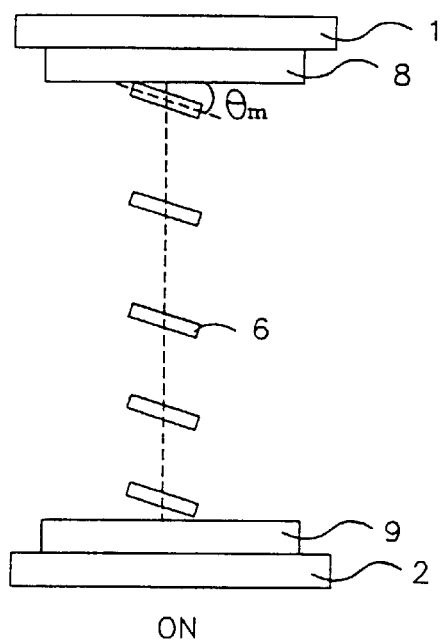
Figure 8C:
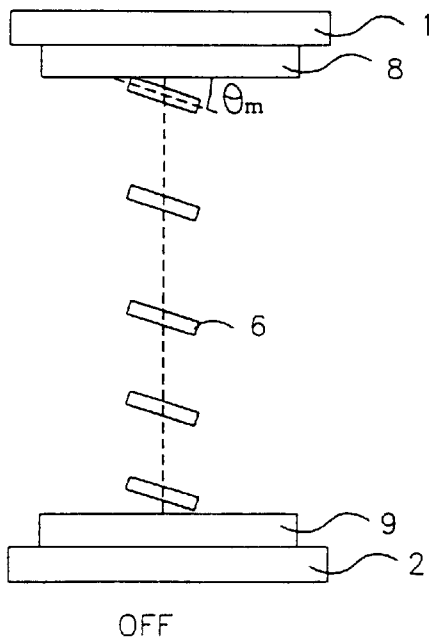
Figure 8D:
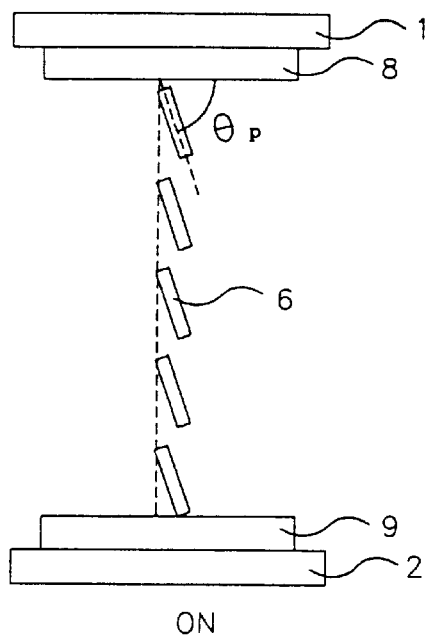
Figure 9A:
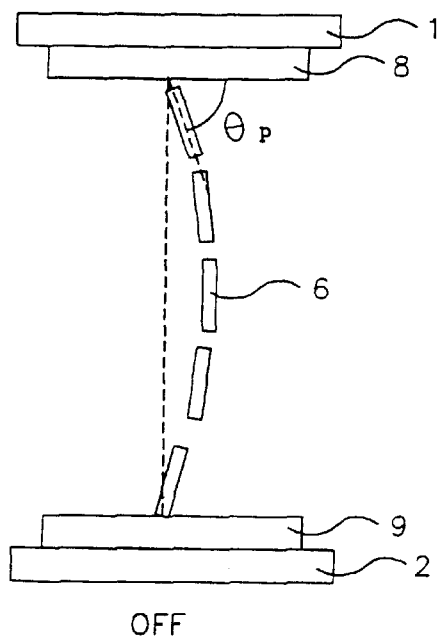
FIGS. 9(a)–(d) show cross-sectional views of a bend mode liquid crystal cells according to this invention.
Figure 9B:
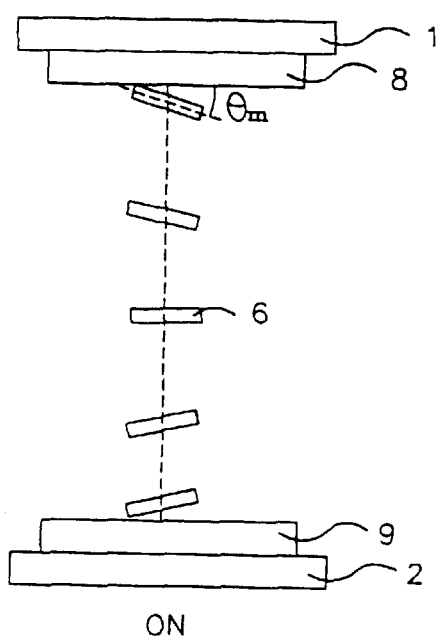
Figure 9C:
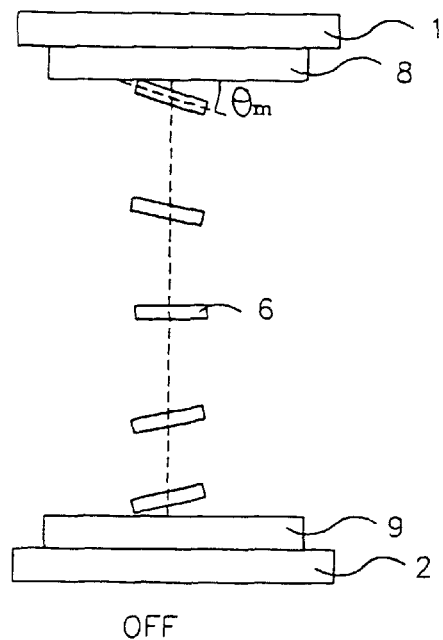
Figure 9D:
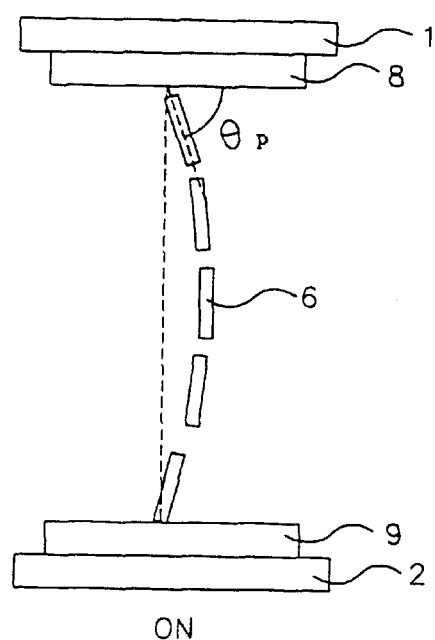

The polarized light is irradiated in the perpendicular direction into the second substrate 2 coated with a second alignment layer 9 so as to determine a second pretilt angle and two pretilt angle direction facing each other as shown in FIG. 6c and FIG. 6d. To select one pretilt angle direction, this embodiment adopts the flowing effect of liquid crystal materials in which the pretilt angle direction is determined according to the flowing direction of liquid crystal material flown as shown in FIG. 6e, FIG. 6f. Attaching the first substrate 1 having uni-pretilt determined alignment layer 8 by rubbing and second substrate 2 having two pretilts oriented with two pretilt angle directions determined a photo-aligned layer 9, then liquid crystal materials are injected between two substrates. By the flowing effect of liquid crystal materials, the liquid crystal materials adjacent the second alignment layer 9 is aligned uni-second pretilt angle direction by a single exposure.

There are several mode of liquid crystal cell depending the configuration between the first pretilt angle direction and the second pretilt angle direction determined by either abovementioned process.

FIG. 7 is reffering a TN mode liquid crystal cell. FIG. 7a and FIG. 7b are showing a vertical aligned liquid crystal cell controlling depending upon the voltage. FIG. 7c and FIG. 7d are showing a horizontal aligned liquid crystal cell.

FIG. 8 is reffering a ECB mode liquid crystal cell. FIG. 8a and FIG. 8b are showing a vertical aligned liquid crystal cell controlling depending upon the voltage. FIG. 8c and FIG. 8d are showing a horizontal aligned liquid crystal cell.

FIG. 9 is reffering a bend mode liquid crystal cell. FIG. 9a and FIG. 9b are showing a vertical aligned liquid crystal cell controlling depending upon the voltage. FIG. 9c and FIG. 9d are showing a horizontal aligned liquid crystal cell.

Figure 10A:
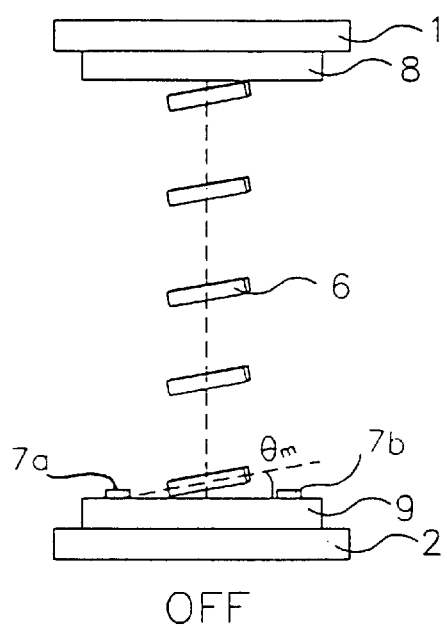
Figure 10B:
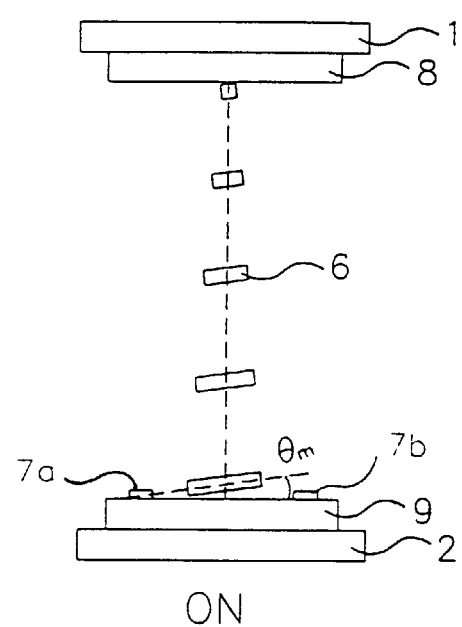

FIG. 10 is reffering a IPS mode liquid crystal cell in which the liquid crystal molecules are shift in plane dependind on the voltage.

This invention can be applied in a multi-domain liquid crystal cell to provide wider viewing angle. Some embodiments of process for manufacturing the multi-domain liquid crystal cell are in FIG. 11, FIG. 12, FIG. 13 and FIG. 14.

FIG. 11 is showing one embodiment of this invention to provide a multi-domain liquid crystal cell in which the first alignment layer 8 is provided a first pretilt by mechanically rubbing, and the second alignment layer 9 is provided two pretilts in two domains by using the light.

Figure 11A:
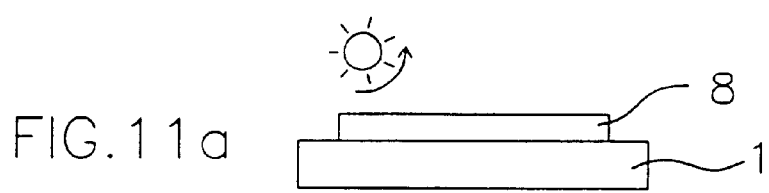
FIGS. 11(a)–(g) show step in a process for fabricating a multi-domain liquid crystal cell according to this invention.
Figure 11B:
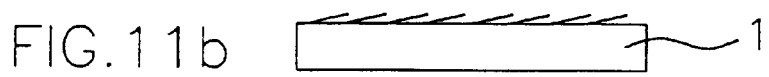
Figure 11C:
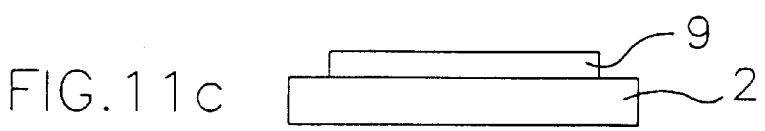
Figure 11D:
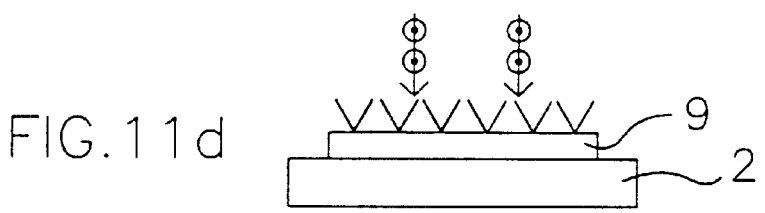
Figure 11E:
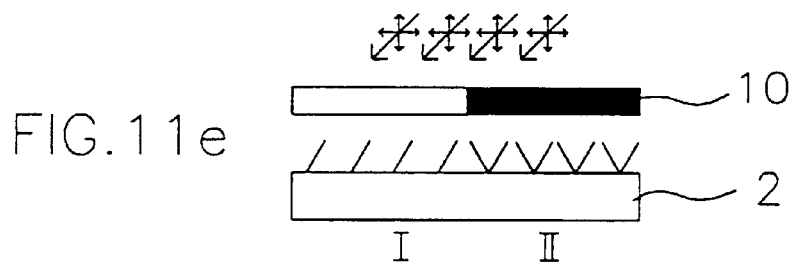

FIG. 11a and FIG. 11b is showing the rubbing process to provide a first pretilt on the alignment layer 8 with low pretilt angle, almost 0°. FIG. 11c–FIG. 11f are showing the process for forming two second pretilts on two domains of the second alignment layer 9 with a high photo-energy to provide low pretilt angle less than 5°. The polarized light is irradiated in the perpendicular direction onto the second alignment layer 9 so as to determined a second pretilt angle and two pretilt angle direction, as shown in FIG. 11d. To select a first pretilt angle direction for a first domain I, the nonpolarized light is irradiated in the first oblique direction to the second substrate 2 in which a second domain II is covered with the mask 10. Thereby, the 2-1th pretilt is formed on a first domain I, the 2-1th pretilt defined a second pretilt angle and a first pretilt angle direction, as shown in FIG. 11e.

Figure 11F:
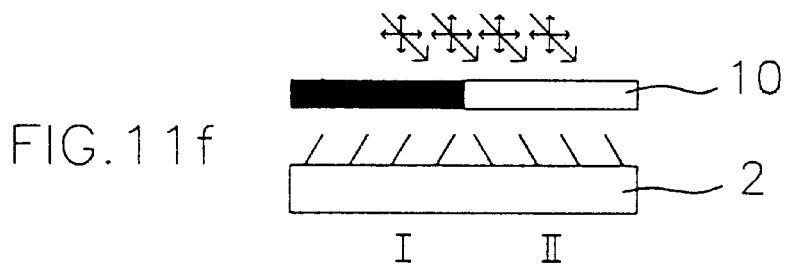

To select a 2-2th pretilt angle direction for a second domain II, the mask 10 covering the second domain II is moved to the first domain I. The nonpolarized light is irradiated in the second oblique direction to the second substrate 2 in which a first domain I is covered with the mask 10. Thereby, the 2-2th pretilt is formed on a second domain II, as shown in FIG. 11f, the 2-2th pretilt meaning a second pretilt angle and a second pretilt angle direction.

Figure 11G:
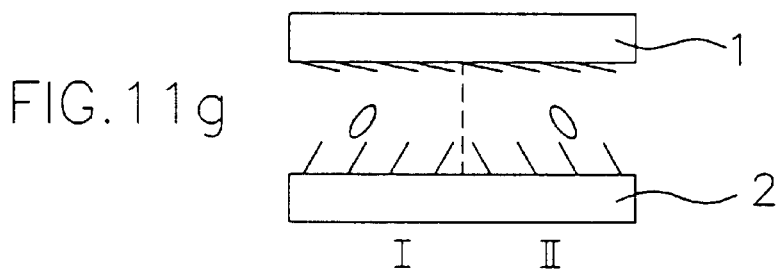

Assembling the first substrate 1 and the second substrate 2, liquid crystal materials are injected between two substrates 1,2. The molecules of liquid crystal materials are arranged in the different direction between domains as shown in FIG. 11g depending the second pretilts.

Thereby, the viewing angle is compensated by differently aligning the liquid crystal molecules according to domains so as to get a wider viewing angle liquid crystal cell.

In this embodiment, the two-domain liquid crystal cell is possible to obtain multi-domain liquid crystal cell without photolithograpy. In addition, the alignment stability is provided by the first pretilt.

FIG. 12 is showing another embodiment of this invention to provide a vertical aligned mode multi-domain liquid crystal cell in which the first alignment layer 8 is provided a first pretilt by mechanically rubbing, and the second alignment layer 9 is provided two pretilts in two domains by using the light.

Figure 12A:
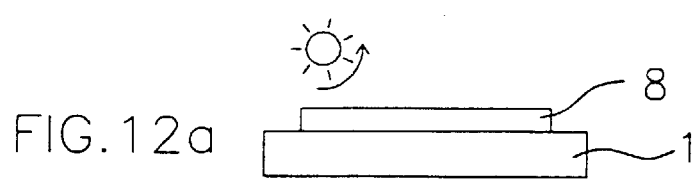
FIGS. 12(a)–(g) show steps in a process for fabricating a multi-domain liquid crystal cell according to this invention.
Figure 12B:
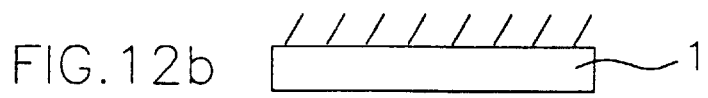
Figure 12C:
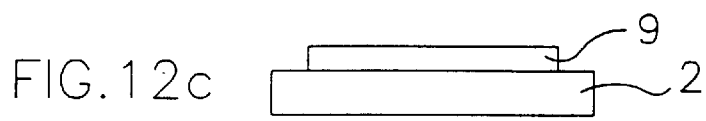
Figure 12D:
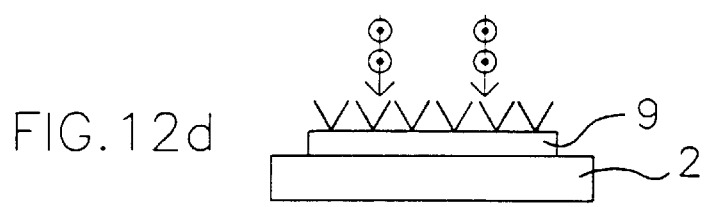
Figure 12E:
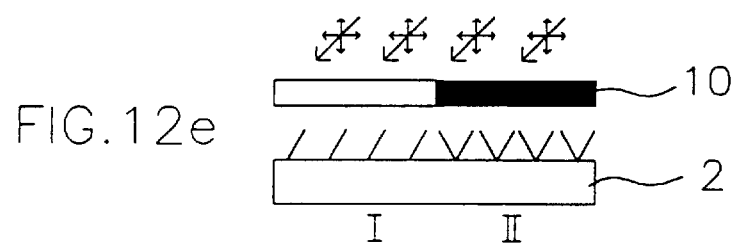

FIG. 12a and FIG. 12b is showing the rubbing process to provide a first pretilt on the alignment layer 8 with high pretilt angle larger than 60°. FIG. 12c–FIG. 12f are showing the process for forming two second pretilts on two domains of the second alignment layer 9 with a low photo-energy to provide high pretilt angle less than 60°. The polarized light is irradiated in the perpendicular direction onto the second alignment layer 9 so as to determined a second pretilt angle and two pretilt angle direction, as shown in FIG. 12d. To select a first pretilt angle direction for a first domain I, the nonpolarized light is irradiated in the first oblique direction to the second substrate 2 in which a second domain II is covered with the mask 10. Thereby, the 2-1th pretilt is formed on a first domain I, the 2-1th pretilt defined a second pretilt angle and a first pretilt angle direction, as shown in FIG. 12e.

Figure 12F:
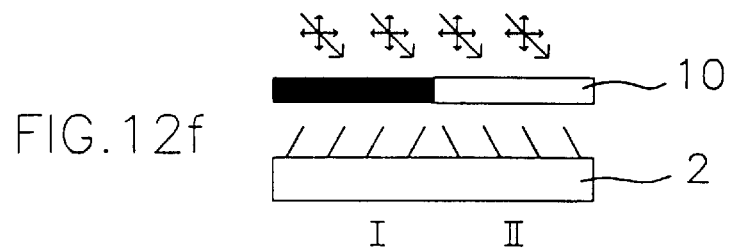

To select a 2-2th pretilt angle direction for a second domain II, the mask 10 covering the second domain II is moved to the first domain I. The nonpolarized light is irradiated in the second oblique direction to the second substrate 2 in which a first domain I is covered with the mask 10. Thereby, the 2-2th pretilt is formed on a second domain II, as shown in FIG. 12f, the 2-2th pretilt meaning a second pretilt angle and a second pretilt angle direction.

Figure 12G:
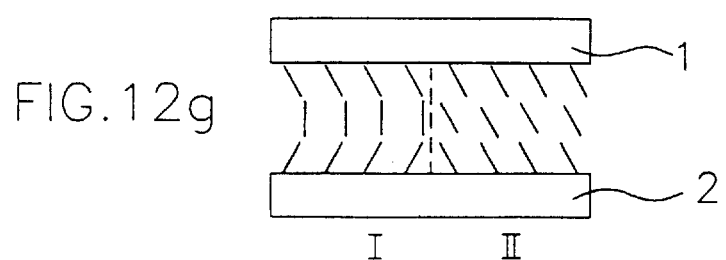

Assembling the first substrate 1 and the second substrate 2, liquid crystal materials are injected between two substrates 1,2. The molecules of liquid crystal materials are arranged in the different direction between domains as shown in FIG. 12g depending the second pretilts. This vertical algined liquid crystal cell has a bend mode in the first domain I and a ECB mode in the second domain II.

Thereby, the viewing angle is compensated by differently aligning the liquid crystal molecules according to domains so as to get a wider viewing angle liquid crystal cell.

In this embodiment, the two-domain liquid crystal cell is accomplished by low photo-energy so it is possible to obtain multi-domain liquid crystal cell without photolithograpy. In addition, the alignment stability is provided by the first pretilt.

FIG. 13 is showing another embodiment of process for multi-domain liquid crystal cell.

Figure 13A:
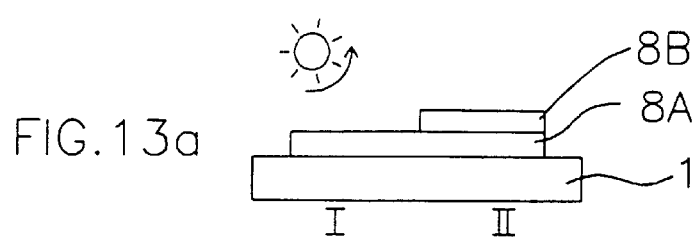
FIGS. 13(a)–(f) show steps in a process for fabricating a multi-domain liquid crystal cell according to this invention.
Figure 13B:
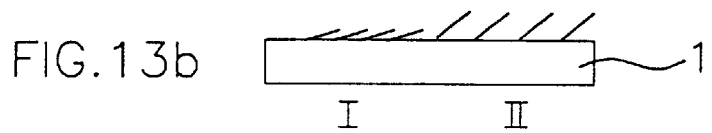

FIG. 13a and FIG. 13b is showing the rubbing process to provide a 1-1th pretilt and 1-2th pretilt on a first domain I and a second domain II of the first substrate 1 with different pretilt angle, such as 1-1th pretilt angle is larger than 1-2th pretilt angle. The alignment layer for dividing domain is shown in FIG. 13a, an organic alignment layer 8A is covered with an inorganic alignment layer 8B on the first substrate 1. In the organic alignment layer 8A, pretilt angle is formed larger than in the inorganic alignment layer 8B. Thus, the 1-1th pretilt is defined a low 1-1th pretilt angle and a first pretilt angle direction, and the 1-2th pretilt is defined a high 1-2th pretilt angle a first pretilt angle direction.

Figure 13C:
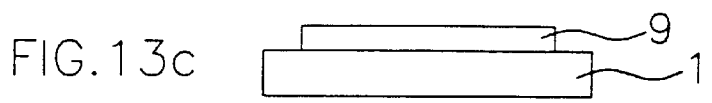
Figure 13D:
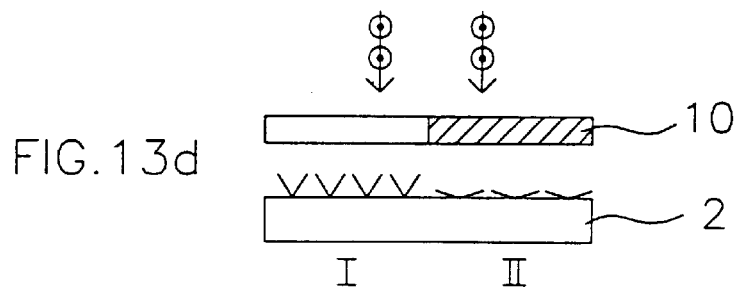
Figure 13E:
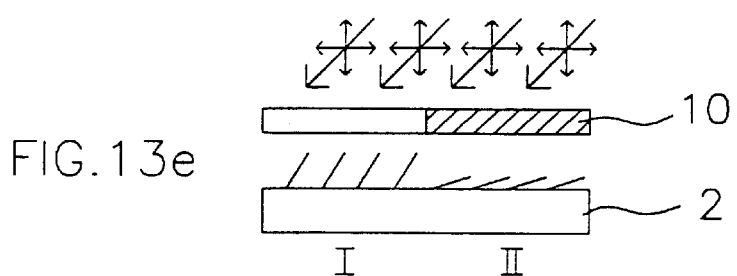

FIG. 13c–FIG. 13d are showing the process for two domained the second substrate 2 with dividing two pretilts by differing two pretilt angles. The substrate 2 coated with a second alignment layer 9 is covered with a mask 10 comprising of a transparent part for a first domain I and a semi-transparent part for a second domain II. The polarized light is irradiated in the perpendicular direction onto the second substrate so as to determined a high 2-1th pretilt angle, a second alignment direction and two second pretilt angle directions on a first domain I, and a low 2-2th pretilt angle and two second pretilt angle directions on a second domain II. To select a second pretilt angle direction for a first domain I and a second domain II, the nonpolarized light is irradiated in the oblique direction to the second substrate 2. Thereby, the 2-1th pretilt and 2-2th pretilt are formed on a first domain I and a second domain II, respectively, the 2-1th pretilt meaning a high 2-1 pretilt angle and a second pretilt angle direction, and the 2-1th pretilt meaning a low 2-2 pretilt angle and a second pretilt angle direction, as shown in FIG. 13e.

Figure 13F:
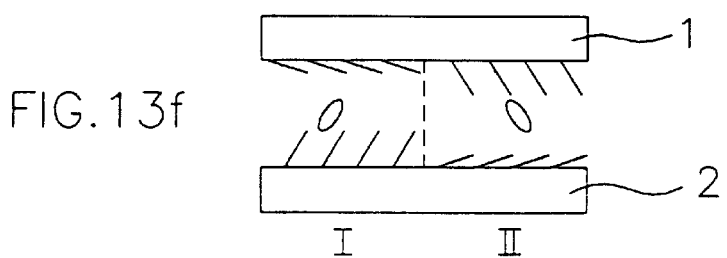

Assembling the first substrate 1 and the second substrate 2, liquid crystal materials are injected between two substrates 1,2. The molecules of liquid crystal materials are aligned in the different direction between domains as shown in FIG. 13f depending the pretilt angles.

Thereby, the viewing angle is compensated by differently aligning the liquid crystal molecules according to domains so as to get a wider viewing angle liquid crystal cell.

In this embodiment, the two-domain liquid crystal cell is possible to obtain multi-domain liquid crystal cell without photolithograpy. In addition, the alignment stability is provided by the rubbed first alignment.

FIG. 14 is showing a process for fabricating four-domain liquid crystal cell. A two-domain first substrate 1 is prepared by the reverse rubbing, as shown in FIG. 14a, FIG. 14b and FIG. 14c. The Four-domain second substrate 2 is prepared by changing the photo-irradiating direction, as shown in FIG. 14d–FIG. 14i.

Attaching two substrates 1,2, liquid crystal materials are injected between two substrates 1,2. The, the viewing angle is compensated by differently aligning the liquid crystal molecules according to each domain, as shown in FIG. 14g so as to get a wider viewing angle liquid crystal cell.

This invention can be adopted to the various mode liquid crystal cells such as a TN mode, a ECB mode, a bend mode, and a IPS mode by controlling the alignment direction.

In this invention, it is possible to provide alignment stability by rubbed first alignment layer, and to increase the yield by aligning using light instead of rubbing so as to eliminating damages caused by rubbing process.

In addition, the multi-domain liquid crystal cell can be obtained by simply process without a photolithograpy for reverse rubbing.

It is to be understood that the form of the present invention herein show and described is to be taken as a preferred example of the same and that various application such as the change the photo-irradiation order, may be resorted to without departing from the spirit of the present invention or the scope of the subjoined claims.

What is claimed is:

1. A liquid crystal display device comprising:
   a first substrate;
   a rubbed layer provided on said first substrate;
   a second substrate;
   photo-aligned layer provided on said second substrate; and
   liquid crystal material provided on said first and second substrates, first molecules of said liquid crystal material adjacent said rubbed layer are aligned in a first direction having a first pre-tilt angle and a first pre-tilt angle direction, second molecules of said liquid crystal material adjacent said photo-aligned layer are aligned in a second direction having a second pre-tilt angle and a second pre-tilt angle direction, wherein at least one of said first pre-tilt angle and said second pre-tilt angle is in a range from 75°–87°, wherein said first pre-tilt angle direction is substantially parallel with said second pre-tilt angle direction.

2. The device in accordance with claim 1, wherein said rubbed layer comprises a polyimide.

3. The device in accordance with claim 1, wherein said photo-aligned layer comprises a polysiloxane based material.

4. The device in accordance with claim 1, wherein a plurality of liquid crystal molecules are provided adjacent respective portions of said photo-aligned layer, each plurality of liquid crystal molecules having a corresponding pre-tilt angle and pre-tilt angle direction.

5. A liquid crystal display device comprising:
   a first substrate;
   a rubbed layer provided on said first substrate;
   a second substrate;
   a photo-aligned layer provided on said second substrate; and
   liquid crystal material provided on said first and second substrates, first molecules of said liquid crystal material adjacent said rubbed layer are aligned in a first direction having a first pre-tilt angle and a first pre-tilt angle direction, second molecules of said liquid crystal material adjacent said photo-aligned layer are aligned in a second direction having a second pre-tilt angle and a second pre-tilt angle direction, wherein at least one of said first pre-tilt angle and said second pre-tilt angle is in a range from 75°–87°, wherein said first pre-tilt angle direction is substantially perpendicular to said second pre-tilt angle direction.

6. The device in accordance with claim 5, wherein said rubbed layer comprises a polyimide.

7. The device in accordance with claim 5, wherein said photo-aligned layer comprises a polysiloxane based material.

8. The device in accordance with claim 5, wherein a plurality of liquid crystal molecules are provided adjacent respective portions of said photo-aligned layer, each plurality of liquid crystal molecules having a corresponding pre-tilt angle and pre-tilt angle direction.

9. A liquid crystal display device comprising:
   a first substrate;
   a rubbed layer provided on said first substrate;
   a second substrate;
   a photo-aligned layer provided on said second substrate; and
   liquid crystal material provided on said first and second substrates, first molecules of said liquid crystal material adjacent said rubbed layer are aligned in a first direction having a first pre-tilt angle and a first pre-tilt angle direction, second molecules of said liquid crystal material adjacent said photo-aligned layer are aligned in a second direction having a second pre-tilt angle and a second pre-tilt angle direction, wherein at least one of said first pre-tilt angle and said second pre-tilt angle is in a range from 75°–87°, wherein said first pre-tilt angle direction is substantially anti-parallel to said second pre-tilt angle direction.

10. The device in accordance with claim 9, wherein said rubbed layer comprises a polyimide.

11. The device in accordance with claim 9, wherein said photo-aligned layer comprises a polysiloxane based material.

12. The device in accordance with claim 9, wherein a plurality of liquid crystal molecules are provided adjacent respective portions of said photo-aligned layer, each plurality of liquid crystal molecules having a corresponding pre-tilt angle and pre-tilt angle direction.

* * * * *